(12) United States Patent
Bresciani et al.

(10) Patent No.: US 9,188,427 B2
(45) Date of Patent: Nov. 17, 2015

(54) PROJECTIVE OPTICAL METROLOGY SYSTEM

(71) Applicant: Thales Alenia Space Italia S.p.a. Con Unico Socio, Turin (IT)

(72) Inventors: Fulvio Bresciani, Turin (IT); Fabio Musso, Turin (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 330 days.

(21) Appl. No.: 13/921,328

(22) Filed: Jun. 19, 2013

(65) Prior Publication Data

US 2014/0002827 A1    Jan. 2, 2014

(30) Foreign Application Priority Data

Jun. 19, 2012   (IT) .............................. TO2012A0538

(51) Int. Cl.
| | |
|---|---|
| G01S 5/00 | (2006.01) |
| G01B 11/14 | (2006.01) |
| G01S 17/74 | (2006.01) |
| G01S 5/16 | (2006.01) |

(52) U.S. Cl.
CPC ................ G01B 11/14 (2013.01); G01S 5/163 (2013.01); G01S 17/74 (2013.01)

(58) Field of Classification Search
CPC .......... G01B 11/14; G01B 5/163; G02B 6/26; G02B 6/293; G01S 5/16; G01S 5/163; G01S 17/74
See application file for complete search history.

(56) References Cited

U.S. PATENT DOCUMENTS

| | | | |
|---|---|---|---|
| 4,740,951 A | 4/1988 | Lizet et al. | |
| 6,072,633 A | 6/2000 | Park et al. | |
| 7,495,748 B1* | 2/2009 | Sandusky et al. | ............... 356/5.1 |
| 7,561,262 B2 | 7/2009 | Napierala et al. | |
| 2003/0071996 A1 | 4/2003 | Wang | |
| 2008/0074640 A1* | 3/2008 | Walsh et al. | ................. 356/5.01 |

FOREIGN PATENT DOCUMENTS

| | | |
|---|---|---|
| EP | 1986018 | 10/2008 |
| WO | WO 2009130062 | 10/2009 |

OTHER PUBLICATIONS

Italian Search Report for European Patent Application No. 13172914.7 dated Oct. 16, 2013.
Italian Search Report Dated Mar. 21, 2013.

* cited by examiner

*Primary Examiner* — Luke Ratcliffe
*Assistant Examiner* — Hovhannes Baghdasaryan
(74) *Attorney, Agent, or Firm* — McCarter & English, LLP

(57) ABSTRACT

A projective optical metrology system including a first optical unit, which includes: an optical input that receives a first light signal; a number of optical paths; and a separator, which is optically interposed between the optical input and the optical paths and separates a number of components of the first light signal received by the optical input and couples each of the separate components to a corresponding optical path. The first optical unit also includes a light target, which emits a second light signal and is formed by a number of light elements, each light element being optically coupled to a corresponding optical path, so as to be illuminated, in use, by the component of the first light signal coupled to the corresponding optical path. The metrology system also includes a second optical unit, which generates the first light signal and receives the second light signal.

15 Claims, 3 Drawing Sheets

PROJECTIVE OPTICAL METROLOGY SYSTEM

The present invention relates to a projective optical metrology system.

BACKGROUND OF THE INVENTION

As is known, numerous metrology systems are available today, which among other fields, also find application in the aerospace field.

In particular, metrology systems are known that enable determining the attitude and/or position of a satellite. Even more particularly, metrology systems are known that, given a pair of satellites, enable determining the mutual position and the mutual attitude between the two satellites.

Determination of the attitudes and positions of satellites is of particular importance in the case of satellite systems in which the satellites are in formation, i.e. in cases where control of the attitude and/or position of each satellite as a function of the attitude/position of the other satellites is envisaged.

In practice, given two satellites, determining the mutual attitude and the mutual position requires determining six degrees of freedom. In particular, assuming a first and a second reference system, respectively integral with a first and a second satellite and each formed by a respective set of three perpendicular axes, the mutual attitude and the mutual position between the first and the second reference system, and therefore between the first and the second satellite, can be expressed in terms of (linear) displacements and rotations (angles). Even more particularly, the mutual position of the second satellite with respect to the first satellite can be expressed by a set of three displacements; similarly, the mutual attitude of the second satellite with respect to the first satellite can be expressed by a set of three angles.

That having been said, projective optical metrology systems are such that, given two satellites, one of them is equipped with a target formed by a number N of light sources, and the other satellite is equipped with an optical unit, which includes an optoelectronic sensor capable of acquiring an image of the target, on the basis of which, by means of post-processing, the optical unit determines one or more of the above-mentioned degrees of freedom.

By way of example, patent application EP1986018 discloses a system for determining the position and orientation of a system with six degrees of freedom, where the number N of light sources of the target is equal to one. However, to enable the determination of all six degrees of freedom, the system disclosed in EP1986018 requires that the sole light source is formed by a source of coherent light, for example, a laser, and also requires that the optical unit, in addition to processing the images of the target, is capable of taking measurements of the power effectively received by the optoelectronic sensor and a rotation angular measurement of polarization of the light beam emitted by the coherent light source. The system disclosed in EP1986018 therefore requires that both satellites have suitable optoelectronic circuits and a respective power supply.

On the other hand, metrology systems are known that do not contemplate determination of the power measurement, i.e. metrology systems of a purely projective type. An example of these metrology systems is provided in U.S. Pat. No. 7,561,262, where the light sources are formed by reflectors designed to be arranged on the second satellite, and which are illuminated by radiation emitted by the first satellite. In particular, referring to the transceiving unit and to the reflecting unit to indicate the portions of the metrology system described in U.S. Pat. No. 7,561,262 and arranged on the first and on the second satellite, respectively, this metrology system makes use of a passive-type reflecting unit. Therefore, the second satellite does not need any optoelectronic circuit, or a corresponding power supply, with a consequent reduction in energy consumption.

Although the metrology system described in U.S. Pat. No. 7,561,262 is therefore characterized by a relative constructional simplicity and reduced consumption, it contemplates that the transceiving unit, which equips the first satellite, emits an optical beam having a spatial distribution such as to effectively impinge on all the reflectors that equip the second satellite. Therefore, the optical beam is characterized by a cross-section of significant dimensions; consequently, the transceiving unit requires a significant amount of electric power in order to generate the optical beam.

Patent application US2003/071996 describes an optical metrology system that subdivides wideband radiation into a multiplicity of narrow-band subbands; each subband is associated with a subband optical system able to optimize performance regarding the range of wavelengths covered by the subband. In addition, the radiation of each subband is directed onto a detector, which generates corresponding electrical signals that can be processed by a processing unit.

U.S. Pat. No. 4,740,951 describes an integrated optical demultiplexer that is able to separate a plurality of monochromatic components forming a light beam that propagates in an input optical fibre; in addition, the demultiplexer is able to convey the thus-separated components to a plurality of output optical fibres.

U.S. Pat. No. 6,072,633 describes an apparatus able to generate, given an optical beam at input, three optical beams at output, having different colours. The apparatus comprises a pair of dichroic mirrors, a high-reflectivity wideband mirror and a gaseous material, which is interposed between the wideband mirror and the second dichroic mirror.

SUMMARY OF THE INVENTION

The aim of the present invention is to provide a projective optical metrology system that at least partially resolves the drawbacks of the known art.

According to the invention, a projective optical metrology system is provided as defined in the appended claims.

BRIEF DESCRIPTION OF THE DRAWINGS

For a better understanding of the invention, some embodiments will now be described, purely by way of non-limitative example and with reference to the attached drawings, where.

DETAILED DESCRIPTION OF THE INVENTION

Figure 1:
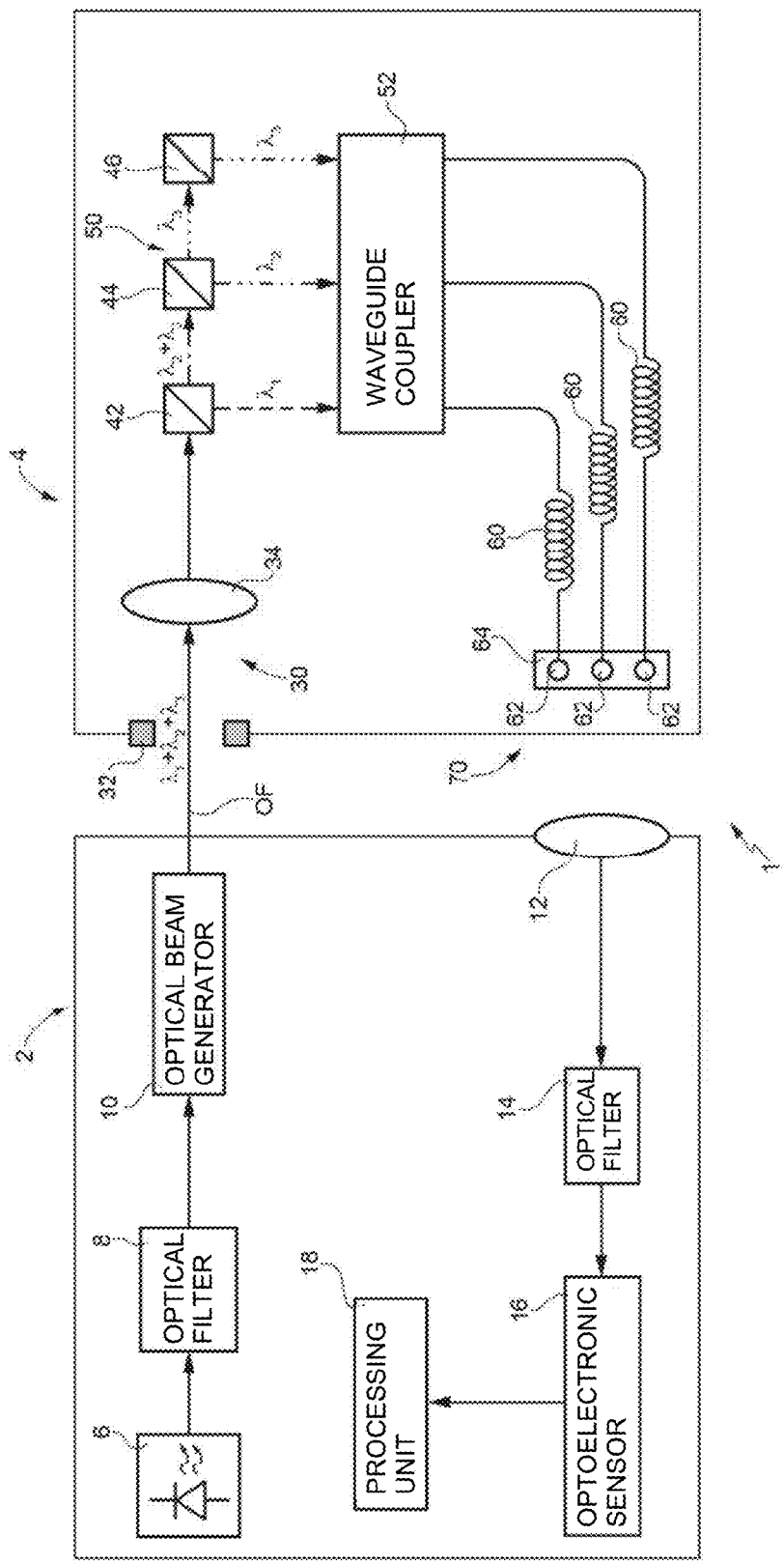
FIG. 1 shows a block diagram of a first and a second units of a metrology system.

FIG. 1 shows an optical metrology system of the projective type, which will be referred to henceforth as the metrology system 1 for brevity. Furthermore, the metrology system 1 is hereinafter described with particular reference to a satellite application, although it may also be used in different application areas. In particular, for simplicity, reference is made hereinafter to a satellite system 3 formed by a first and a second satellites sat1 and sat2 and shown in FIG. 2.

In detail, the metrology system 1 comprises a transceiving unit 2 and a passive unit 4, which are respectively constrained to the first and the second satellite sat1 and sat2. In this regard, it can be noted that, for simplicity of representation, in FIG. 1 the transceiving unit 2 and the passive unit 4 are placed, at a purely qualitatively close range.

The transceiving unit 2 comprises an optical source 6, a first optical filter 8 and an optical beam generator 10, which are optically connected to each other. In particular, the optical source 6 is able to generate an optical signal that is received by the first optical filter 8, which generates a corresponding filtered signal. The filtered signal is then received by the optical beam generator 10, which radiates an optical beam OF.

In detail, the optical signal generated by the optical source 6 may be of both the continuous type and the modulated type; in this second case, the optical signal can, for example, be modulated in amplitude and, in particular, with an on/off modulation. Furthermore, in the present embodiment, the optical signal is formed by so-called white light, i.e. its spectrum is non-zero for wavelengths ranging between 380 nm and 760 nm. In any case, embodiments are possible in which the optical signal has a non-zero spectrum in different spectral regions, such as the ultraviolet and infrared regions for example.

The first optical filter 8 is of the bandpass type and is able to filter the optical signal such that the spectrum of the filtered signal has N peaks (relative maximums), respectively arranged at wavelengths $\lambda_1, \lambda_2, \ldots \lambda_N$; to that end, the spectrum of the transfer function of the first optical filter 8 has N passbands, each of which is centred on a respective passband central wavelength, which is equal to a corresponding wavelength from among the wavelengths $\lambda_1, \lambda_2, \ldots \lambda_N$. Corresponding forbidden bands, where the spectrum of the transfer function is substantially zero, or rather takes values lower than 10% of the spectrum maximum, are interposed between the passbands.

Purely by way of example, reference is made in the present description to an embodiment where N=3, although N can take any non-zero integer value. The optical beam is therefore formed by electromagnetic radiation with wavelengths $\lambda_1, \lambda_2$ and $\lambda_3$.

The optical beam generator 10 is formed, for example, by one or more lenses that are able to shape, in a known manner, the spatial form of the optical beam OF that is emitted into free space.

The transceiving unit 2 further comprises an optical input system 12, for example formed by one or more lenses and arranged so as to receive an optical response signal, described in detail further on.

The transceiving unit 2 further comprises a second optical filter 14 and an optoelectronic sensor 16.

The second optical filter 14 is optically coupled to the optical input system 12, which is able to collimate and direct the optical response signal to a second optical filter 14 that, in response, generates a signal to be analysed, this last signal to be analysed being finally received by the optoelectronic sensor 16.

For reasons that are described further on, the second optical filter 14 is of the bandpass type. In particular, the spectrum of the transfer function of the second optical filter 14 has N passbands, each of which is centred on a respective passband central wavelength, which is equal to a corresponding wavelength from among the wavelengths $\lambda_1, \lambda_2, \ldots \lambda_N$. Corresponding forbidden bands, where the spectrum of the transfer function is substantially zero, are interposed between the passbands. In other words, the spectrum of the transfer function of the second optical filter 14 is substantially equal to the spectrum of the transfer function of the first optical filter 8.

In response to receiving the signal to be analysed, the optoelectronic sensor 16 is able to generate a corresponding electrical signal.

In detail, the optoelectronic sensor 16 may be formed, for example, in a known manner, by a charge coupling device (CCD), which includes a flat sensitive surface formed by a plurality of pixels. On striking the sensitive surface of the optoelectronic sensor, the signal to be analysed forms an image, the electrical signal generated by the optoelectronic sensor 16 being indicative of this image.

The transceiving unit 2 further comprises a processing unit 18, which is connected to the optoelectronic sensor 16, so as to receive the electrical signal generated by the latter. The processing unit 18 is of a known type and is able to determine the position and/or the attitude of the second satellite sat2 with respect to the first satellite sat1, on the basis of the electrical signal generated by the optoelectronic sensor 16. To this end, the processing unit 18 executes known processing algorithms on the electrical signal generated by the optoelectronic sensor 16. In other words, the processing unit 18 determines one or more quantities related to the position and/or attitude of the second satellite sat2 with respect to the first satellite sat1, on the basis of the image formed by the signal to be analysed on the sensitive surface of the optoelectronic sensor 16.

Figure 2:
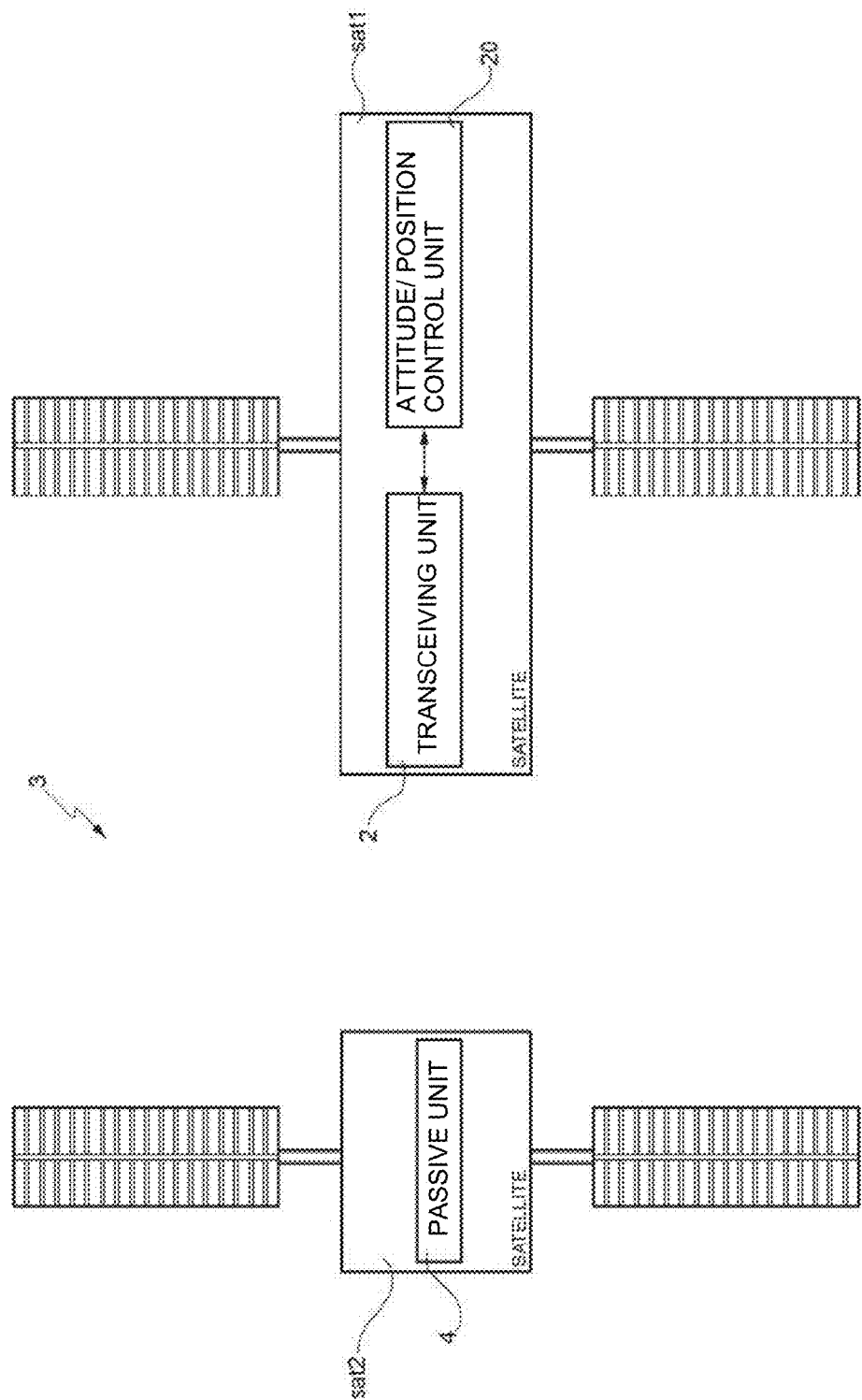
FIG. 2 shows a block diagram of a satellite system including two satellites, to which the first and the second units shown in FIG. 1 are respectively attached.

As shown in FIG. 2, the transceiving unit 2, and in particular the processing unit 18, is electrically connected to an attitude and/or position control system 20, of a known type and constrained to the first satellite sat1. In a known manner, the attitude and/or position control system 20 controls the attitude and/or position of the first satellite sat1, on the basis of the position and/or attitude determined by the processing unit 18.

With regard to the passive unit 4, this comprises an optical collector 30, which forms an optical input of the passive unit and is able to receive and collimate the optical beam generated by the optical beam generator 10. In the embodiment shown in FIG. 1, the optical collector 30 is formed by a diaphragm 32, suitable for being traversed by at least a part of the optical beam, and by a collimating lens 34, arranged downstream of the diaphragm 32 and at the output of which, in use, a collimated signal is formed. For example, the diaphragm 32 has circular symmetry and the diameter of the collimating lens 34 is greater than the diameter of the diaphragm 32; furthermore, the diaphragm 32 and the collimating lens 34 have coincident optical axes.

In practice, the diaphragm 32 forms the optical input of the passive unit 4 and delimits a corresponding physical aperture, which forms a corresponding optical aperture, i.e. a region through which light rays are able to pass. However, it is possible to have embodiments in which the collimating lens 34 is not present or is arranged in a manner to occupy the physical aperture delimited by the diaphragm 32, as well as embodiments in which the lens 34 is replaced by a system of lenses.

The passive unit 4 further comprises a first, second and third dichroic elements 42, 44 and 46.

Each of the first and second dichroic elements 42 and 44 has a respective dichroic element wavelength. Furthermore, considering any dichroic element from the first and second dichroic elements 42 and 44 and given a corresponding generic signal that impinges on it, the same dichroic element is able to reflect a first component of this generic signal along a first direction, this first component being substantially monochromatic at a wavelength equal to the dichroic element wavelength of the dichroic element considered. In addition, the dichroic element considered is able to transmit all of the components of the generic signal differing from the first component, namely all the monochromatic components with wavelengths different from the dichroic element wavelength, along a second direction. The second direction may, for example, be orthogonal to the first direction. For example, each dichroic element may be formed, in a known manner, by a corresponding dichroic beam splitter.

In greater detail, the first dichroic element 42 is able to reflect a first component of the collimated signal, monochromatic at wavelength $\lambda_1$, along the respective first direction. In addition, the first dichroic element 42 is able to transmit a first intermediate signal, formed by the components of the collimated signal having wavelengths different from $\lambda_1$, along the respective second direction. In the embodiment shown in FIG. 1, the first intermediate signal therefore has a spectrum with two peaks, located at wavelengths $\lambda_2$ and $\lambda_3$.

The second dichroic element 44 is able to receive the first intermediate signal and to reflect a second component of the collimated signal, monochromatic at wavelength $\lambda_2$, along the respective first direction. In addition, the second dichroic element 44 is able to transmit a second intermediate signal, formed of the components of the collimated signal having wavelengths different from $\lambda_2$, along the respective second direction. Thus, in the embodiment shown in FIG. 1, the second intermediate signal coincides with a third component of the collimated signal, monochromatic at wavelength $\lambda_3$; therefore, the second intermediate signal has a spectrum with just one peak, located at wavelength $\lambda_3$.

The first directions of the first and second dichroic elements 42 and 44 may, for example, be parallel to each other. Furthermore, the second directions of the first and second dichroic elements 42 and 44 may coincide with each other.

With regard to the third dichroic element 46, this is able to receive the second intermediate signal and reflect the last remaining component of the collimated signal, monochromatic at wavelength $\lambda_3$, along the respective first direction. The first direction of the third dichroic element 46 may, for example, be parallel to the first directions of the first and second dichroic elements 42 and 44.

In principle, the third dichroic element 46 is also able to transmit a third intermediate signal, formed by the components of the collimated signal having wavelengths different from $\lambda_3$, along the respective second direction. However, as there are no further components of the collimated signal present downstream of the second dichroic element 44, the third intermediate signal is substantially null. For the same reason, embodiments are possible in which, instead of the third dichroic element 46, a non-frequency-selective reflecting element is present, which is able to reflect the second intermediate signal, namely the component of the collimated signal monochromatic at wavelength $\lambda_3$, along a direction parallel to the first directions of the first and second dichroic elements 42 and 44.

In use, the above-mentioned first, second and third components of the collimated signal, each of which is substantially monochromatic at a respective wavelength, consequently propagate in parallel to each other.

By way of clarification, in the description reference is made to a signal that is monochromatic at a given wavelength, or more briefly to a signal at a given wavelength, to indicate a signal having a spectrum such that the main portion (for example, equal to 86% of the entire spectrum) is contained within a band centred on the given wavelength and having a width of not more than one nanometer.

For practical purposes, the first and second dichroic elements 42 and 44 and the reflecting element 46 form a first chromatic separator 50, which, given a non-monochromatic input signal, spatially separates it into a plurality of monochromatic components. Furthermore, as the input signal to this first chromatic separator 50, namely the collimated signal, substantially does not have other components in addition to the monochromatic components that are effectively separated by the first chromatic separator 50, no appreciable power losses occur.

The passive unit 4 further comprises a waveguide coupler 52, which has N optical inputs and N optical outputs. Each optical input is able to receive a corresponding component from the first, second and third components of the collimated signal; furthermore, each optical input of the waveguide coupler 52 is optically coupled, in a one-to-one coupling, to a corresponding optical output.

The passive unit 4 further comprises N optical fibres 60, each of which is connected, at a first end thereof, to a corresponding optical output of the waveguide coupler 52.

For practical purposes, the first chromatic separator 50 and the waveguide coupler 52 cooperate to separate the N monochromatic components of the collimated signal and to optically couple each of the separate monochromatic components to a corresponding optical fibre 60. Furthermore, the first chromatic separator 50 is coupled to the set of optical fibres 60 in a way such that it is optically comparable to a bandpass filter, and in particular to a bandpass filter equal to the first optical filter 8, i.e. with a same transfer function.

Again, with reference to the optical fibres 60, and considering any one of them, the respective second end defines a corresponding light element 62, i.e. a flat surface that, in use, is illuminated, and in particular is illuminated by the monochromatic component of the collimated signal coupled into the optical fibre. In FIG. 1, the second ends, namely the light elements 62, are shown qualitatively.

Figure 3:
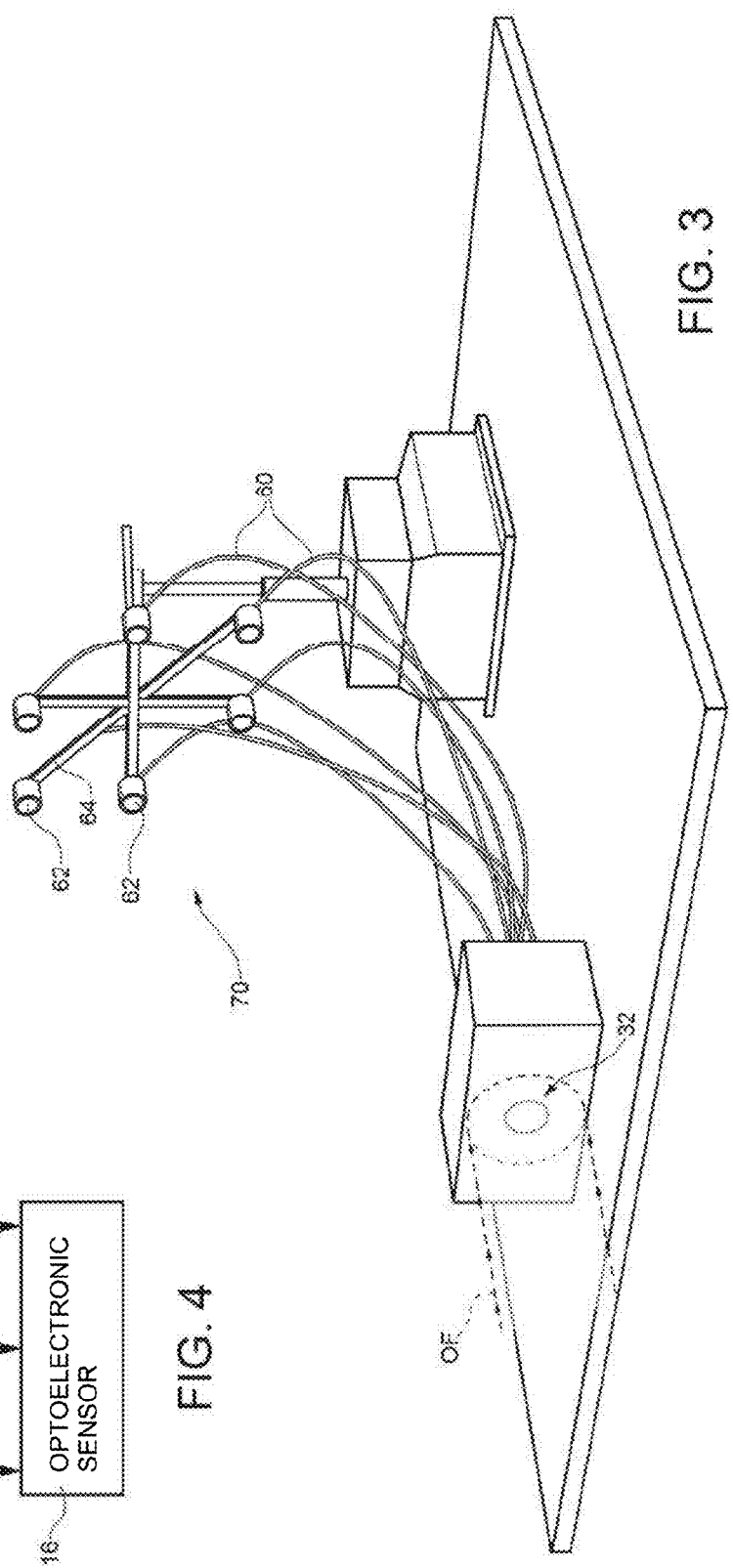
FIG. 3 shows a perspective view of portions of the second unit shown in FIG. 1.

The second ends of the N optical fibres 60 are constrained to a support 64, which is able to keep the reciprocal arrangement of these second ends fixed, as shown for example in FIG. 3. For example, according to the embodiment shown in FIG. 3, the support 64 is such that the light elements 62 are coplanar and are placed at the vertices of a hypothetical polygon.

In practice, the N optical fibres 60 define N optical paths of the guided type. Furthermore, the N light elements 62 define a light target 70, which emits the above-mentioned response signal.

As previously mentioned, the response signal is received by the optical input system 12 of the transceiving unit 2, from where it is directed to the second optical filter 14, which generates the signal to be analysed.

As previously mentioned, when it strikes the optoelectronic sensor 16, the signal to be analysed forms an image, which is formed by a number of image points equal to the number of light elements 62 of the light target 70. On the basis of the arrangement of these image points on the sensitive surface and on the (known) shape of the light target 70, as previously mentioned, the processing unit 18 determines, in a known manner, at least one quantity indicative of the attitude and/or position of the second satellite sat2 with respect to the first satellite sat1.

As previously mentioned, the second optical filter 14 is able to filter components of the response signal at wavelengths different from wavelengths $\lambda_1$, $\lambda_2$ and $\lambda_3$. This filtering operation enables the removal of possible undesired contributions present in the signal to be analysed, particularly such as light contributions caused by stars that fall within the field of view (FoV) of the optical input system 12. In this regard, it should in fact be considered that, in the absence of the second optical filter 14, light radiation emitted by any star that falls within the field of view of the optical input system 12 determines a corresponding contribution to the signal to be analysed, which, in turn, causes the formation of a corresponding undesired image point on the sensitive surface of the optoelectronic sensor 16. This undesired image point generates a corresponding undesired contribution to the electrical signal generated by the optoelectronic sensor 16 and can therefore be interpreted by the processing unit 18 as an image point corresponding to a (non-existent) light element of the light target 70, causing errors in determination of the attitude and/or position.

The filtering operation performed by the second optical filter 14 therefore enables a significant reduction in possible contributions to the signal to be analysed caused by stars or anyway by luminous objects other than the light target 70. In fact, still referring, for example, to the case of a star, of all the radiation it emits, only the components at wavelengths $\lambda_1$, $\lambda_2$ and $\lambda_3$ are able to reach the optoelectronic sensor 16. However, these components have negligible power with respect to the corresponding components of the response signal, as sent by the passive unit 4 and therefore generate undesired image points that are easily distinguished from the image points effectively corresponding to the light target 70. These image points, in a limit case, could be so weak that they do not excite any pixel of the optoelectronic sensor 16, or the light intensity values detected by the pixels they excite are anyway so much lower with respect to the light intensity values detected by the pixels excited by the image points corresponding to the light target 70, to enable electronic cancellation of the corresponding contributions to the electrical signal, by the processing unit 18.

Figure 4:
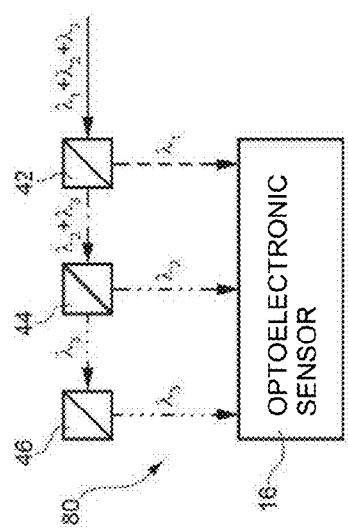
FIG. 4 shows a block diagram of a portion of the first unit shown in FIG. 1.

For practical purposes, the second optical filter 14 can be formed, purely by way of example, by a second chromatic separator 80 equal to the first chromatic separator 50, as shown in FIG. 4, where elements already present in the first chromatic separator 50 are indicated by the same reference numerals.

Referring to "signal to be filtered" to indicate the response signal, as collimated by the optical input system 12 at the input of the second optical filter 14, the second optical filter 14 modifies the signal to be filtered not only from the spectral viewpoint, but also geometrically.

In particular, the signal to be filtered comprises N monochromatic components, each of which is generated by a corresponding light element 62 of the light target 70 and is centred on a corresponding wavelength from among the wavelengths $\lambda_1$, $\lambda_2$ and $\lambda_3$. Therefore, strictly speaking, each monochromatic component of the signal to be filtered impinges on the second optical filter 14 from a different direction.

Assuming, for simplicity of description, that the monochromatic components of the signal to be filtered impinge on the second optical filter 14 with a same direction, at output from the second optical filter 14 these monochromatic components propagate along different, but parallel, directions, as each monochromatic component of the signal to be filtered is deviated by a same angle by the second chromatic separator 80. This last characteristic ensures that the spatial distribution of the signal to be filtered, i.e. the reciprocal inclinations of the directions of propagation of the monochromatic components, is not altered by the second chromatic separator 80. Therefore, the presence of the second optical filter 14 does not entail any distortion of the image of the light target that forms on the optoelectronic sensor 16, with respect to a reference case where the second optical filter 14 is absent. Therefore, the presence of the second optical filter 14 does not impede correct execution of the algorithms by the processing unit 18 for the determination of the attitude and/or position.

On the other hand, embodiments are possible in which the second optical filter 14 is different. For example, embodiments are possible in which the second optical filter 14 is formed by a prism.

Embodiments are also possible in which the second optical filter causes a change in the spatial distribution of the signal to be filtered, and therefore modifies the directions of propagation of the monochromatic components by different angles. In this case, a distorted image forms on the optoelectronic sensor 16, with respect to what would happen in the case of absence of the second optical filter. Nevertheless, in a manner which is known, it is still possible to determine a transfer matrix indicative of these different angles, on the basis of which the processing unit 18 determines, starting from the positions on the sensitive surface of the image points of the distorted image, the positions of the corresponding image points of a corrected image, i.e. of the image that would be formed on the sensitive surface of the optoelectronic sensor 16 if the geometrical distortion effect introduced by the second optical filter were absent. Determination of the attitude and/or position is then carried out by the processing unit 18 on the basis of the corrected image.

The advantages that can be achieved with the present metrology system clearly emerge from the foregoing description. In particular, since the optical beam OF emitted by the optical beam generator 10 only illuminates the diaphragm 32, it can have a smaller cross-section with respect to traditional optical reflector units. In fact, the area of the diaphragm 32, which defines an input surface for the optical beam OF of a simply connected type, can be made much smaller with respect to the overall transversal space occupied by the light target 70.

From a more quantitative point of view, assuming a reference direction parallel to the axis of the diaphragm 32, it is possible to refer to a "first area" to indicate the area obtained by projecting, with lines parallel to the reference direction, the diaphragm 32 onto a reference plane perpendicular to the reference direction. In addition, it is possible to refer to a "second area" to indicate the area obtained by projecting the light target 70 onto the reference plane, with lines parallel to the reference direction. That having been said, the first area is smaller than the second area. Similar considerations hold in the case where the optical input of the passive unit 4 is formed by some set of optical elements, on the assumption of referring to the above-mentioned first area to indicate the area of the optical aperture formed by the optical input of the passive unit 4, the optical aperture being such that each portion of the optical beam OF that passes through it with a direction parallel to a coupling direction, which depends on the optical structure of the optical input, is coupled to at least one optical fibre 60, while any portions of the optical beam OF that do not pass through this optical aperture are not coupled to the optical fibres 60.

It is therefore possible to make use of the advantages, in terms of power consumption and circuit simplicity, of a passive optical unit, without this entailing an increase in consumption of the optical unit that generates the optical beam designed to illuminate the passive optical unit.

As previously explained, the described metrology system also features a better resilience to undesired effects caused by the presence of luminous objects other than the light target 70 within the field of view of the optical input system 12.

Finally, it is clear that modifications and variants can be made to the described metrology system without departing from the scope of the present invention.

For example, instead of a white light, the optical source 6 could generate light with a spectrum having N relative maximums, at wavelengths $\lambda_1, \ldots, \lambda_N$, and which is substantially zero for wavelengths different from wavelengths $\lambda_1, \ldots, \lambda_N$. In this case, the optical source 6 may be formed by N substantially monochromatic elementary sources, each of which emits coherent radiation at a corresponding wavelength from among the wavelengths $\lambda_2, \ldots \lambda_N$. More in particular, each elementary source may be formed by a corresponding LED diode or a corresponding laser. Furthermore, in this embodiment, the first optical filter 8 may be absent, or anyway have a single passband, inside which the wavelengths $\lambda_1, \lambda_2, \ldots \lambda_N$ fall.

With regard to the first optical filter 8, the first chromatic separator 50 and the second optical filter 14, one or more of these could, for example, be formed by a so-called periodic or quasi-periodic structure, such as a Bragg grating for example. In a known manner, the periodic or quasi-periodic structure is designed so that the spectrum of the transfer function is of the previously described type.

With regard to the processing unit 18, this could calculate, as stated, just a subset of the quantities related to the attitude and/or position.

With regard to the first chromatic separator 50, this could be replaced by a non-frequency-selective optical beam splitter. This optical beam splitter, of a known type, cooperates with the waveguide coupler 52 such that each of the optical fibres 60 is still coupled to a corresponding component of the collimated signal; however, the thus coupled components are not monochromatic, but wideband components. In this case, these components of the collimated signal have substantially a same spectral content.

Instead of optical fibres 60, waveguides of a different type could be present. If required, the optical paths related to the light elements 62 could be of the non-guided type, in which case, inside the passive unit 4, the monochromatic components of the collimated signal, after being separated, propagate at least partly in free space. In this case, the first chromatic separator can be formed, for example, by a prism.

Finally, it is possible that the first chromatic separator 50 and the waveguide coupler 52 are absent, in which case the first ends of the optical fibres 60 can be grouped to form a bundle of fibres, which is illuminated by the optical beam OF and acts as a non-frequency-selective optical beam splitter. Also in this embodiment, the diaphragm 32 and/or the collimating lens 34 can be absent or replaced with different optical elements. In the case where both the diaphragm 32 and the collimating lens 34 are absent, the set of the first ends of the optical fibres 60 forms the optical input of the passive unit 4; in particular, the first ends of the optical fibres 60 form corresponding optical apertures of the optical input of the passive unit 4.

The invention claimed is:

1. A projective optical metrology system comprising a first and a second optical units, the first optical unit comprising:
    an optical input configured to receive a first light signal;
    a number of optical paths;
    a separator configured to separate a number of components of the first light signal received by the optical input and to couple each of the separated components to a corresponding optical path; and
    a light target designed to emit a second light signal and formed by a number of light elements, each light element being optically coupled to a corresponding optical path, so as to be illuminated, in use, by the component of the first light signal coupled to said corresponding optical path;
and wherein the second optical unit comprises:
    a light source designed to generate said first light signal;
    an optoelectronic sensor designed to receive said second light signal, such that said second light signal forms an image of the light target on said optoelectronic sensor; and
    an electronic processing unit configured to determine at least one quantity indicative of the mutual arrangement of the light target and the second optical unit, on the basis of said image.

2. The metrology system according to claim 1, wherein said optical input delimits an optical aperture and is configured to couple the first light signal to the separator by means of said optical aperture.

3. The metrology system according to claim 1, wherein said second optical unit further comprises an optical system designed to receive said second light signal and direct it towards the optoelectronic sensor.

4. The metrology system according to claim 1, wherein the separator is configured such that each separate component is substantially monochromatic at a corresponding component wavelength, the component wavelengths being mutually different.

5. The metrology system according to claim 4, wherein the separator comprises a plurality of dichroic elements, each dichroic element being associated with a corresponding wavelength and being configured to receive a respective input optical signal and to reflect a first component of said respective input optical signal along a first direction and to transmit components of said respective input optical signal differing from said first component along a second direction, said first component being substantially monochromatic at the wavelength associated with said dichroic element.

6. The metrology system according to claim 4, wherein said second optical unit further comprises an optical system designed to receive said second light signal and direct it towards the optoelectronic sensor, said optical system comprising a bandpass type optical filter having a transfer function, the spectrum of which has a number of passbands equal to the number of light elements, each passband including a corresponding wavelength from among said component wavelengths.

7. The metrology system according to claim 6, wherein said optical system comprises a plurality of dichroic elements.

8. The metrology system according to claim 1, wherein each of said optical paths is at least partly of a guided type.

9. The metrology system according to claim 8, wherein each of said optical paths is formed by a corresponding optical fibre.

10. The metrology system according to claim 9, wherein each optical fibre has a first and a second ends, the first end being connected to said separator, the second end defining a corresponding light element of the light target.

11. The metrology system according to claim 1, wherein said optical input comprises a diaphragm.

12. The metrology system according to claim 1, wherein said optical input comprises a lens designed to collimate said first light signal.

13. The metrology system according to claim 1, wherein said separator is optically interposed between said optical input and said optical paths.

14. The metrology system according to claim 1, wherein said light source is configured to generate said first light signal such that it is formed entirely by a number of substantially monochromatic components equal to the number of light elements.

15. A satellite system comprising a first and a second satellites and a projective optical metrology system according to claim 1, wherein the first and the second optical units are respectively constrained to the second and the first satellites; and further comprising an attitude and/or position control system constrained to the first satellite and configured to receive said at least one quantity determined by the electronic processing unit.

* * * * *